US009165275B2

(12) United States Patent
Fornage (10) Patent No.: US 9,165,275 B2
(45) Date of Patent: Oct. 20, 2015

(54) METHOD AND APPARATUS FOR IDENTIFYING REDEPLOYED DISTRIBUTED GENERATOR COMPONENTS

(75) Inventor: Martin Fornage, Petaluma, CA (US)

(73) Assignee: Emphase Energy, Inc., Petaluma, CA (US)

( * ) Notice: Subject to any disclaimer, the term of this patent is extended or adjusted under 35 U.S.C. 154(b) by 845 days.

(21) Appl. No.: 12/804,017

(22) Filed: Jul. 12, 2010

(65) Prior Publication Data

US 2011/0016147 A1    Jan. 20, 2011

Related U.S. Application Data

(60) Provisional application No. 61/270,809, filed on Jul. 14, 2009.

(51) Int. Cl.
*G05B 19/00* (2006.01)
*G06Q 10/08* (2012.01)
*G08B 13/14* (2006.01)
*H02J 3/38* (2006.01)

(52) U.S. Cl.
CPC ............ *G06Q 10/08* (2013.01); *G08B 13/1418* (2013.01); *H02J 3/383* (2013.01); *Y02E 10/563* (2013.01); *Y04S 10/56* (2013.01)

(58) Field of Classification Search
USPC .......................... 340/10.1–10.6, 572.1–572.9; 235/375–385
See application file for complete search history.

(56) References Cited

U.S. PATENT DOCUMENTS

| 6,545,211 | B1 | 4/2003 | Mimura |
| 7,103,433 | B1 * | 9/2006 | Yuan et al. ...................... 700/95 |
| 2002/0008621 | A1 | 1/2002 | Barritz et al. |
| 2006/0248699 | A1 | 11/2006 | Sievenpiper et al. |
| 2006/0265613 | A1 | 11/2006 | Egan et al. |
| 2007/0027655 | A1 | 2/2007 | Schmidt |
| 2007/0106574 | A1 | 5/2007 | Kappel et al. |
| 2008/0122293 | A1 * | 5/2008 | Ohm ............................... 307/86 |
| 2008/0188955 | A1 | 8/2008 | Dittes |
| 2008/0212343 | A1 | 9/2008 | Lasseter et al. |
| 2009/0009298 | A1 | 1/2009 | Brissman et al. |
| 2010/0097220 | A1 * | 4/2010 | Cheng ......................... 340/572.1 |
| 2010/0236598 | A1 * | 9/2010 | Roy et al. ...................... 136/244 |

FOREIGN PATENT DOCUMENTS

| CN | 1439190 | 8/2003 |
| EP | 1326286 A | 7/2003 |

(Continued)

OTHER PUBLICATIONS

International Search Report and Written Opinion dated Feb. 18, 2011 for PCT Application No. PCT/US2010/041725.

*Primary Examiner* — James Yang
(74) *Attorney, Agent, or Firm* — Moser Taboada (57) ABSTRACT

A method and apparatus for identifying a redeployment of a distributed generator component, at least a portion of the method being performed by a controller comprising at least one processor. In one embodiment, the method comprises obtaining a first identification (ID) for a first component of a distributed generator (DG) and a second ID for a second component of the DG; generating an association between the first identifier and the second identifier, wherein the association identifies a relationship between the first and the second components; and comparing the association to a plurality of documented associations to determine whether the association has changed.

18 Claims, 6 Drawing Sheets

(56) References Cited

FOREIGN PATENT DOCUMENTS

| | | |
|---|---|---|
| JP | 2000-164906 A | 6/2000 |
| JP | 2008-310483 | 12/2008 |
| WO | WO 2008/043814 A1 | 4/2008 |
| WO | WO 2009/026602 A1 | 3/2009 |

* cited by examiner

METHOD AND APPARATUS FOR IDENTIFYING REDEPLOYED DISTRIBUTED GENERATOR COMPONENTS

CROSS-REFERENCE TO RELATED APPLICATIONS

This application claims benefit of U.S. provisional patent application Ser. No. 61/270,809, filed Jul. 14, 2009, which is herein incorporated in its entirety by reference.

BACKGROUND OF THE INVENTION

1. Field of the Invention

Embodiments of the present disclosure relate generally to solar power systems and, more particularly, to a method and system for identifying solar power system components redeployed in the solar power system without authorization.

2. Description of the Related Art

Use of distributed generators (DGs) to produce energy from renewable resources is steadily gaining commercial acceptance due to the rapid depletion of existing fossil fuels and the increasing costs of current methods of generating power. One such type of DG may be utilized within a solar power system, where each DG in the solar power system is comprised of photovoltaic (PV) modules that convert solar energy received from the sun into a direct current (DC). An inverter then converts the DC current from the PV modules into an alternating current (AC). The AC power generated by the DGs may then be used to power appliances at a home or business, or may be sold to the commercial power company.

Although deployment of DGs for generating solar power is becoming increasingly widespread and therefore more competitively priced, installation of such DGs still entails substantial costs, for example costs of individual PV modules and inverters. The out-of-doors and sometimes isolated location of the DGs along with the modularity of the DG components provides an opportunity for the components to be removed without authorization (i.e., stolen) and illegally re-sold for use in another DG.

Therefore, there is a need in the art for identifying solar power system components that are redeployed in a solar power system without authorization.

SUMMARY OF THE INVENTION

Embodiments of the present invention generally relate to a method and apparatus for identifying a redeployment of a distributed generator component, at least a portion of the method being performed by a controller comprising at least one processor. In one embodiment, the method comprises obtaining a first identification (ID) for a first component of a distributed generator (DG) and a second ID for a second component of the DG; generating an association between the first identifier and the second identifier, wherein the association identifies a relationship between the first and the second components; and comparing the association to a plurality of documented associations to determine whether the association has changed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
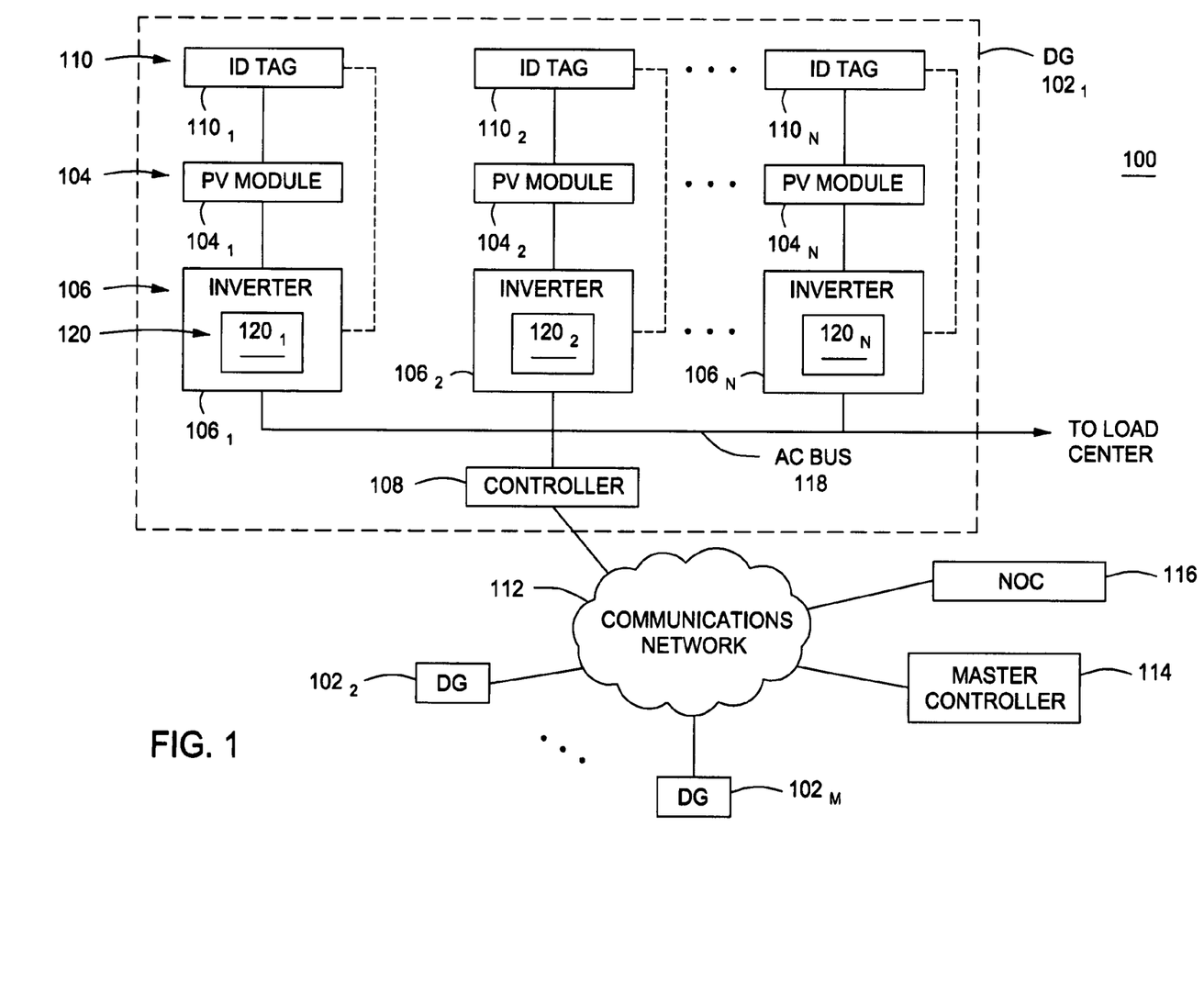
FIG. 1 is a block diagram of a solar power system for distributed power generation in accordance with one or more embodiments of the present invention.

FIG. 1 is a block diagram of a solar power system 100 for distributed power generation in accordance with one or more embodiments of the present invention. The solar power system 100 comprises a plurality of distributed generators (DGs) $102_1, 102_2, \ldots, 102_m$, collectively referred to as DGs 102, a communications network 112, a master controller 114, and a network operations center (NOC) 116. The DGs 102, the master controller 114, and the NOC 116 are communicatively coupled via the communications network 112, where the communications network 112 may comprise dedicated cables, wireless networks, LANs, WANs, the Internet, and the like. In some embodiments, the master controller 114 may reside within the NOC 116.

Each DG 102 comprises a plurality of photovoltaic (PV) modules $104_1, 104_2, \ldots, 104_n$, collectively referred to as PV modules 104, and a plurality of inverters $106_1, 106_2, \ldots, 106_n$, collectively referred to as inverters 106, coupled in a one-to-one correspondence; in some embodiments, a DC/DC converter may be coupled between each PV module 104 and each inverter 106 (e.g., one converter per PV module 104/inverter 106). In some embodiments, a PV module 104 and its corresponding inverter 106 may be physically, as well as electrically, coupled together to form an integrated AC module; in other embodiments, the PV module 104 and the corresponding inverter 106 may be electrically but not physically coupled together. Additionally, each DG 102 comprises a controller 108 and an AC bus 118. Within each DG 102, the inverters 106 and the controller 108 are coupled to the AC bus 118. The inverters 106 invert DC power generated by the PV modules 104 to AC power and couple such AC power to the AC bus 118 for distribution. The generated AC power may be coupled via a load center to a commercial power grid and/or directly supplied to one or more users, for example private residences or businesses. Additionally or alternatively, the generated power may be stored for later use (e.g., utilizing batteries, heated water, hydro pumping, $H_2O$-to-hydrogen conversion, or the like). In some alternative embodiments, one or more of the DGs 102 may comprise other types of renewable energy sources, such as wind farms, hydroelectric systems, or the like.

In some embodiments, the number of PV modules 104 and corresponding inverters 106 may vary among the DGs 102 (i.e., different DGs 102 may comprise different numbers of PV module/inverter pairs). In one or more alternative embodiments, the PV modules 104 within each DG 102 may be coupled to a single centralized inverter for generating the AC power; in some such alternative embodiments, a DC/DC converter may be coupled between the PV modules 104 and the centralized inverter. In other embodiments, one or more of the DGs 102 may comprise a plurality of PV modules 104 coupled to a single centralized inverter, while other DGs 102 comprise a plurality of PV modules 104 coupled to a plurality of inverters 106 in one-to-one correspondence as previously described, or any combination thereof.

The controller 108 manages the DG 102 and communicates with the inverters 106 via power line communication (PLC) over the AC bus 118. In some other embodiments, the controller 108 may communicate with the inverters 106 via alternative methods, such as other types of wired communications or wireless communications. The controller 108 is further coupled to the communications network 112 for communicating with the master controller 114.

The controller 108 collects data pertaining to the health and performance of the PV modules 104 and the inverters 106, and communicates at least a portion of such information to the master controller 114. Additionally or alternatively, the master controller 114 may collect a least a portion of such information directly from the inverters 106 via the controller 108. The controller 108 and/or the master controller 114 may communicate operational instructions to the inverters 106, for example instructions to activate power production, halt power production, and the like.

In accordance with one or more embodiments of the present invention, each PV module $104_1, 104_2, \ldots, 104_n$ may be coupled to an identification (ID) tag $110_1, 110_2, \ldots, 110_n$, such as a radio frequency identification (RFID) tag, in a one-to-one correspondence; in some alternative embodiments where one or more DGs 102 comprise other types of renewable energy sources (e.g., wind farms, hydroelectric systems, or the like), one or more components of such renewable energy sources may be coupled to a tag 110. The ID tags $110_1, 110_2, \ldots, 110_n$, collectively referred to as ID tags 110, are capable of electronically providing a unique identification, such as a serial number, for each of the corresponding PV modules 104 (i.e., the ID tags 110 each provide a PV module ID for the corresponding PV module 104). Each ID tag 110 may be coupled to the corresponding PV module 104 during manufacturing or DG commissioning; alternatively, the ID tag 110 may be a component of the PV module 104 itself. The ID tags 110 may be passive (i.e., not requiring a power supply) or active (e.g., powered by a battery or other power source).

In some embodiments, as further described below, each inverter 106 may comprise an ID management module 120 (i.e., the inverters $106_1, 106_2, \ldots, 106_n$ comprise ID management modules $120_1, 120_2, \ldots 120_n$, respectively) for obtaining the PV module IDs from the corresponding ID tag 110. In some embodiments, each inverter 106 may interrogate the ID tag 110 of the inverter's corresponding PV module 104 to obtain the PV module ID; alternatively, an ID tag 110 may actively transmit the PV module ID to the corresponding inverter 106. In some embodiments, the inverters 106 may each comprise a wireless transceiver (e.g., a radio transceiver) for wirelessly obtaining the PV module IDs; alternatively the PV module IDs may be obtained via wired connections between the inverters 106 and the corresponding ID tags 110. In some alternative embodiments, the ID tag 110 may comprise a simple read only memory (ROM) module rather than, for example, an RFID tag. In such embodiments, contacts would be required for communicatively coupling the ROM to the inverter 106, where communication between the ROM and the inverter 106 may utilize a bus, such as a Serial Peripheral Interface (SPI) bus, an Inter-Integrated Circuit (I2C) bus, or the like.

After obtaining the PV module IDs, the inverters 106 may then provide the PV module IDs to the controller 108 via the PLC; for example, the inverters 106 may actively transmit the information to the controller 108, or the controller 108 may collect such information from the inverters 106. In some embodiments, the inverters 106 may obtain the PV module IDs from the ID tags 110 on demand and/or on a periodic basis, where the periodicity may be set by a user or predefined. Additionally or alternatively, the inverters 106 may obtain the PV module IDs upon activation; for example, the inverter 106 may obtain the PV module ID upon initial turn up and/or following daily activation (e.g., following sunrise). In one or more alternative embodiments, the controller 108 may wirelessly obtain the PV module IDs directly from the ID tags 110 (i.e., the controller 108 may comprise a wireless transceiver for obtaining the information). For example, the ID tags 110 may actively transmit the PV module IDs to the controller 108, or the controller 108 may directly interrogate the ID tags 110 for the PV module IDs In addition to providing the PV module IDs to the controller 108, the inverters 106 may also each provide a unique inverter ID, such as a serial number stored within the inverter's memory, to the controller 108. The controller 108 may then associate the PV module IDs with the corresponding inverter IDs, thereby indicating the relationships between the PV modules 104 and the inverters 106 (i.e., which PV module 104 is coupled to which inverter 106); alternatively, the inverters 106 may make and communicate such associations to the controller 108.

In some embodiments, the controller 108 may associate the PV module IDs and/or the inverter IDs with a controller ID (e.g., an ID stored within the controller's memory), thereby identifying within which DG 102 the PV modules 104 and/or inverters 106 reside. In some alternative embodiments, the controller 108 may only obtain the inverter IDs corresponding to the inverters 106 and associate the inverter IDs with the controller ID (e.g., in some alternative embodiments the inverter 106 may be an integrated component of the PV module 104, such as for an AC module, where a single inverter ID identifies the integrated inverter/PV module).

The controller 108 communicates the associated ID information (e.g., associations between PV module IDs and inverter IDs, PV module IDs and the controller ID, inverter IDs and the controller ID, or the like) to the master controller 114. For example, the controller 108 may actively transmit the information to the master controller 114, or the master controller 114 may collect such information from the controller 108. In some embodiments, the controller 108 may transmit the information to the master controller 114 upon receiving the information, on demand, periodically, based on a set schedule, or the like. In one or more alternative embodiments, the master controller 114 may retrieve IDs for components of one or more DGs 102 (e.g., PV module IDs, inverter IDs, and/or controller IDs) from the controllers 108 or directly from the inverters 106 (e.g., via the controllers 108). In such embodiments, the master controller 114 may associate some or all of the obtained IDs; for example, for each DG 102, the master controller 114 may associate the PV modules IDs and/or the inverter IDs with the corresponding controller ID.

Alternatively, some or all of the ID information may already be associated when obtained by the master controller 114.

The master controller 114 maintains previously recorded ID association information for the DGs 102 in a component tracking database. When one or more components are added to the system 100, for example when a new DG 102 is commissioned or when a PV module 104 or PV module 104/inverter 106 pair (i.e., an AC module) is replaced within an existing DG 102, the master controller 114 analyzes the ID associations for the newly added components. Such analysis comprises comparing the ID associations for the newly added components to the ID associations previously recorded within the component tracking database. Based upon the comparison, the master controller 114 determines whether any ID mismatches exist; i.e., whether any associations for IDs of the newly added components have changed from previously recorded ID associations. Such changes in ID associations indicate that one or more of the newly added components were previously associated with different DG components and have been redeployed within the solar power system 100 without authorization (e.g., stolen from a particular DG 102 and subsequently utilized within another DG 102). For example, when a PV module 104 is added to a DG 102, the corresponding PV module ID may be associated with a different inverter ID than previously recorded in the component tracking database. Such a change in the ID association indicates that the PV module 104 has been removed from another DG 102 without authorization.

In some embodiments, an ID and/or associations between IDs may include an indicia for indicating when the corresponding components are actually legitimately redeployed within the solar power system 100 and, therefore, changes in the ID associations should not be considered to indicate that the components have been redeployed without authorization. For example, a homeowner having a DG may decide to sell one or more of his system's components to another homeowner also having a DG.

In the event that one or more ID mismatches (i.e., changes in ID associations) are determined, the corresponding components may be considered stolen and the master controller 114 may halt power production from the stolen components by issuing the appropriate commands to the corresponding controller 108. The master controller 114 may also determine the current location of the stolen components, for example, by utilizing the IP address of the controller 108 for the DG 102 in which the stolen components have appeared. Additionally or alternatively, the master controller 114 may issue a notification to a user (e.g., an owner of the DG 102) and/or to an appropriate authority, i.e., the police.

If no ID mismatches (i.e., no changes in ID associations) are found for components newly added to the DGs 102, the master controller 114 updates the component tracking database by adding the ID associations corresponding to the newly added components. In some embodiments, the master controller 114 may periodically analyze the ID associations for one or more components of the DGs 102; for example, the master controller 114 may analyze the ID associations based on a set schedule, or as a DG begins power production following sunrise. Additionally, the master controller 114 may periodically update the component tracking database (for example, each time ID associations are analyzed).

Figure 2:
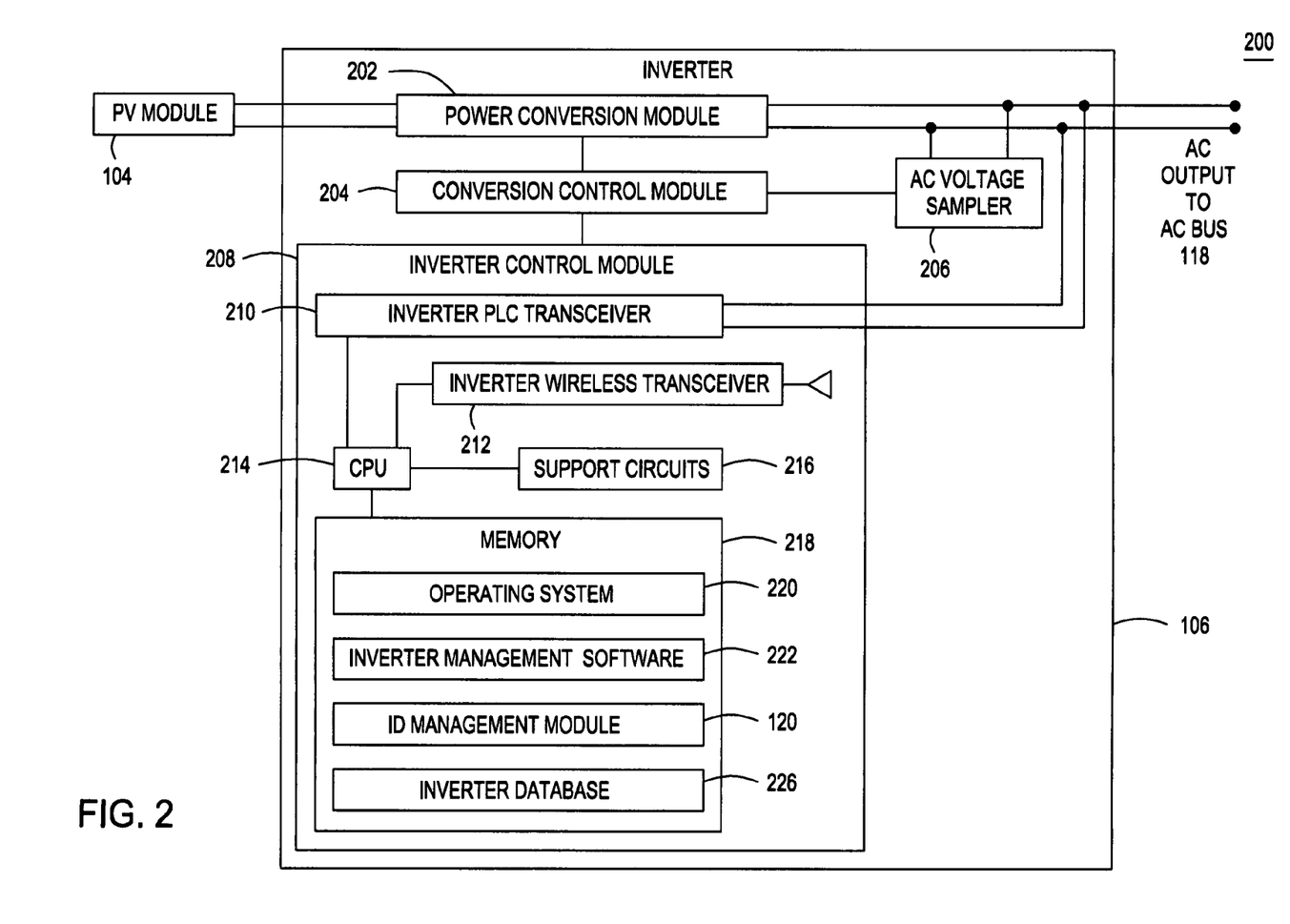
FIG. 2 is a block diagram of an inverter in accordance with one or more embodiments of the present invention.

FIG. 2 is a block diagram of an inverter 106 in accordance with one or more embodiments of the present invention. The inverter 106 comprises a power conversion module 202, a conversion control module 204, an AC voltage sampler 206, and an inverter control module 208.

The power conversion module 202 is coupled via two input terminals to the PV module 104, and via two output terminals to the AC bus 118. The conversion control module 204 is coupled to the power conversion module 202 and the inverter control module 208. The AC voltage sampler 206 is coupled to the two output terminals of the power conversion module 202 and to the conversion control module 204. The AC voltage sampler 206 provides samples of a line voltage, for example an AC commercial power grid voltage, to the conversion control module 204, and the conversion control module 204 provides control and switching signals to the power conversion module 202 for converting DC power from the PV module 104 to AC power. The AC power produced may then be coupled to the commercial power grid such that it is in-phase with the AC grid voltage.

The inverter control module 208 comprises an inverter PLC transceiver 210, an inverter wireless transceiver 212, support circuits 216, and a memory 218, each coupled to a central processing unit (CPU) 214. The CPU 214 may comprise one or more conventionally available microprocessors. Additionally or alternatively, the CPU 214 may include one or more application specific integrated circuits (ASIC). The support circuits 216 are well known circuits used to promote functionality of the CPU 214. Such circuits include, but are not limited to, a cache, power supplies, clock circuits, buses, network cards, input/output (I/O) circuits, and the like. The inverter control module 208 may be implemented using a general purpose computer that, when executing particular software, becomes a specific purpose computer for performing various embodiments of the present invention.

The inverter wireless transceiver 212 communicatively couples the inverter 106 to the ID tag 110 for obtaining the PV module ID, for example, by actively querying the ID tag 110 for the PV module ID. In some alternative embodiments where the PV module ID is obtained via a wired connection between the inverter 106 and the corresponding ID tag 110, the inverter control module 208 may not comprise the inverter wireless transceiver 212.

The inverter PLC transceiver 210 is coupled across the AC bus 118 for communicating with the controller 108 via PLC. Such communication may include providing PV module ID and/or inverter ID information (e.g., IDs, associations between IDs) to the controller 108, receiving operating instructions from the controller 108 (e.g., initiating power production, halting power production), and the like. In one or more alternative embodiments, the inverter control module 208 may communicate with the controller 108 and/or the master controller 114 utilizing wireless or other types of wired communication methods, for example a WI-FI or WI-MAX modem, 3G modem, cable modem, Digital Subscriber Line (DSL), fiber optic, or similar type of technology; in such embodiments, the inverter control module 208 may not comprise the inverter PLC transceiver 210.

The memory 218 may comprise random access memory, read only memory, removable disk memory, flash memory, and various combinations of these types of memory. The memory 218 is sometimes referred to as main memory and may, in part, be used as cache memory or buffer memory. The memory 218 generally stores the operating system 220 of the inverter control module 208 that can be supported by the CPU capabilities. The operating system 220 may be one of a number of commercially available operating systems such as, but not limited to, Linux, Real-Time Operating System (RTOS), and the like.

The memory 218 may store various forms of application software, such as inverter management software 222 for managing the inverter 106 (e.g., for managing power production by the inverter 106). Additionally, the memory 218 may store ID management module 120 for performing various functions related to the present invention. Such functions may include retrieving the PV module ID; retrieving the inverter ID, associating the PV module ID with the inverter ID; and/or providing the PV module ID, inverter ID, and/or related information (e.g., ID associations) to the controller 108. The memory 218 may also store an inverter database 226 for storing information such as the PV module ID, the inverter ID, information associating the PV module ID and the inverter ID, and the like.

Figure 3:
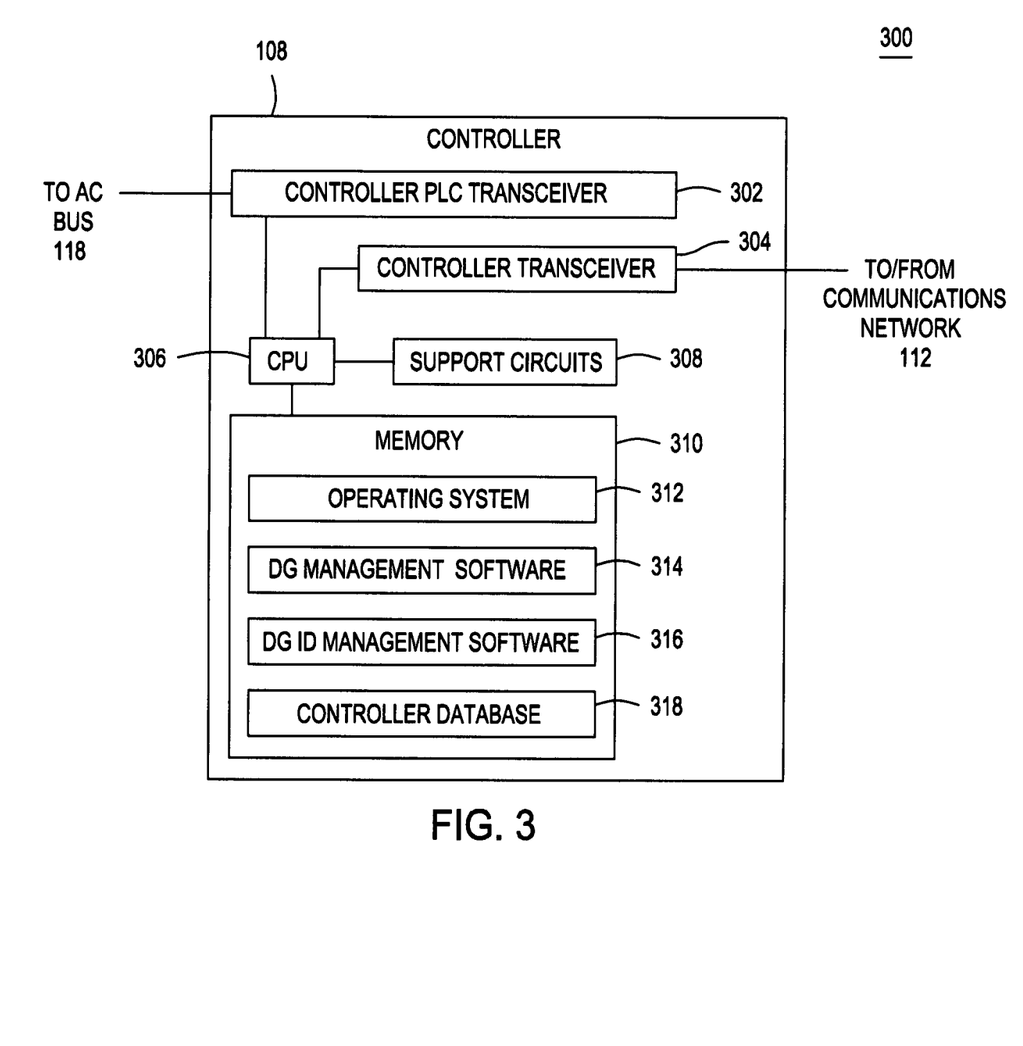
FIG. 3 is a block diagram of a controller in accordance with one or more embodiments of the present invention.

FIG. 3 is a block diagram of a controller 108 in accordance with one or more embodiments of the present invention. The controller 108 comprises a controller PLC transceiver 302, a controller transceiver 304, at least one central processing unit (CPU) 306, support circuits 308, and a memory 310. The CPU 306 is coupled to the controller PLC transceiver 302, the controller transceiver 304, the support circuits 308, and the memory 310, and may comprise one or more conventionally available microprocessors. Additionally or alternatively, the CPU 306 may include one or more application specific integrated circuits (ASIC). The support circuits 308 are well known circuits used to promote functionality of the CPU 306. Such circuits include, but are not limited to, a cache, power supplies, clock circuits, buses, network cards, input/output (I/O) circuits, and the like. The controller 108 may be implemented using a general purpose computer that, when executing particular software, becomes a specific purpose computer for performing various embodiments of the present invention.

The controller PLC transceiver 302 is coupled to the AC bus 118 for communicating with the inverters 106 via PLC, for example, to obtain PV module ID and/or inverter ID information (e.g., IDs, associations between IDs), to provide operating instructions (e.g., initiating power production, halting power production), and the like. In one or more alternative embodiments, the controller 108 may communicate with the inverters 106 utilizing wireless or other types of wired communication methods, for example a WI-FI or WI-MAX modem, 3G modem, cable modem, Digital Subscriber Line (DSL), fiber optic, or similar type of technology.

The controller transceiver 304 communicatively couples the controller 108 to the master controller 114 via the communications network 112 to facilitate the management of the DG 102 (e.g., for operating the controller 108 and/or inverters 106). The controller 108 may provide information pertaining to the DG 102 (e.g., PV module IDs, inverter IDs, a controller ID, associations between PV module IDs, inverter IDs, and/or the controller ID, and similar information), to the master controller 114 via the controller transceiver 304. The controller transceiver 304 may utilize wireless or wired techniques, for example a WI-FI or WI-MAX modem, 3G modem, cable modem, Digital Subscriber Line (DSL), fiber optic, or similar type of technology, for coupling to the network 112 to provide such communication.

The memory 310 may comprise random access memory, read only memory, removable disk memory, flash memory, and various combinations of these types of memory. The memory 310 is sometimes referred to as main memory and may, in part, be used as cache memory or buffer memory. The memory 310 generally stores the operating system 312 of the controller 108. The operating system 312 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 310 may store various forms of application software, such as DG management software 314 for managing the subtending DG 102 and the corresponding components (e.g., controlling inverter power production). Additionally, the memory 310 may store DG ID management software 316 for performing various functions related to the present invention. Such functions may include obtaining the PV module IDs and/or inverter IDs, associating the PV module IDs with the corresponding inverter IDs or obtaining such information from the inverters 106, associating the PV module IDs and/or inverter IDs to the DG 102 (e.g., to the controller ID), and/or providing ID information (e.g., PV module IDs, inverter IDs, a controller ID, associations between IDs, or the like) to the master controller 114. The memory 310 also comprises a controller database 318 for storing information related to the present invention, such as PV module IDs and/or inverter IDs, a controller ID, associations between IDs, and the like.

Figure 4:
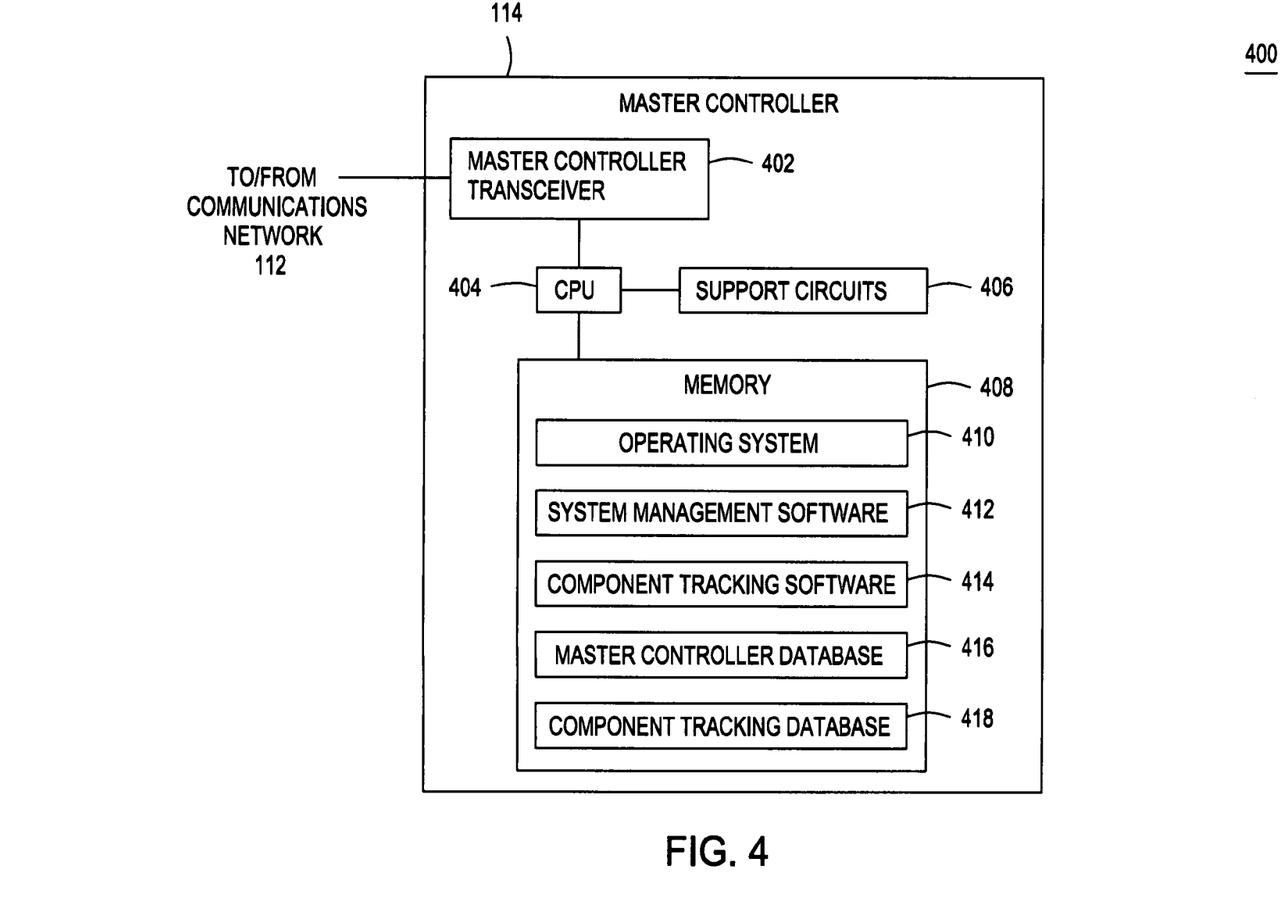
FIG. 4 is a block diagram of a master controller in accordance with one or more embodiments of the present invention.

FIG. 4 is a block diagram of a master controller 114 in accordance with one or more embodiments of the present invention. The master controller 114 comprises a master controller transceiver 402, support circuits 406, and a memory 408, each coupled to at least one central processing unit (CPU) 404. The CPU 404 may comprise one or more conventionally available microprocessors. Additionally or alternatively, the CPU 404 may include one or more application specific integrated circuits (ASIC). The support circuits 406 are well known circuits used to promote functionality of the CPU 404. Such circuits include, but are not limited to, a cache, power supplies, clock circuits, buses, network cards, input/output (I/O) circuits, and the like. The master controller 114 may be implemented using a general purpose computer that, when executing particular software, becomes a specific purpose computer for performing various embodiments of the present invention.

The master controller transceiver 402 communicatively couples the master controller 114 to the controllers 108 via the communications network 112 to facilitate the management of the DGs 102 (e.g., for operating the controllers 108 and/or inverters 106). Additionally, the master controller 114 may receive ID information pertaining to the DGs 102 (e.g., PV module IDs, inverter IDs, controller IDs, associations between IDs, and similar information) from the controllers 108 via the controller transceiver 304. The master controller transceiver 402 may utilize wireless or wired techniques, for example a WI-FI or WI-MAX modem, 3G modem, cable modem, Digital Subscriber Line (DSL), fiber optic, or similar type of technology, for coupling to the network 112 to provide such communication.

The memory 408 may comprise random access memory, read only memory, removable disk memory, flash memory, and various combinations of these types of memory. The memory 408 is sometimes referred to as main memory and may, in part, be used as cache memory or buffer memory. The memory 408 generally stores an operating system 410 of the master controller 114. The operating system 410 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 408 may store various forms of application software, such as system management software 412 for managing DGs 102 of the solar power system 100 (e.g., for providing instructions to the controllers 108 for operating the inverters 106). Additionally, the memory 408 may comprise various databases, such as a master controller database 416 for storing data pertaining to managing the DGs 102 and a component tracking database 418 for storing data related to the present invention (e.g., PV module IDs, inverter IDs, and/or controller IDs, associations between IDs, and the like).

The memory 408 further may store component tracking software 414 for performing various functions related to the present invention. Such functions may include obtaining ID information from the controllers 108 and/or the inverters 106, generating associations between PV module IDs, inverter IDs, and/or controller IDs, and the like. Additionally, the component tracking software 414 analyzes ID associations by comparing the associations for one or more DG components to the ID associations within the component tracking database 418 in order to identify any ID mismatches (i.e., whether any ID associations are different from those previously recorded). Such ID mismatches (e.g., a PV module ID associated with a different inverter ID than that which was previously recorded, a PV module ID/inverter module ID pair associated with a different controller ID than that which was previously recorded) indicate that the corresponding components have been redeployed within the solar power system 100 without authorization (e.g., stolen from a particular DG 102 and utilized within another DG 102).

In the event that any components within the solar power system 100 are determined to have been redeployed without authorization, the master controller 114 may inhibit power production from the corresponding components by issuing control commands to the appropriate inverters 106 via the corresponding controllers 108. The master controller 114 may additionally issue a notification to an appropriate authority and/or a DG user, for example, via the communications network 112.

Figure 5:
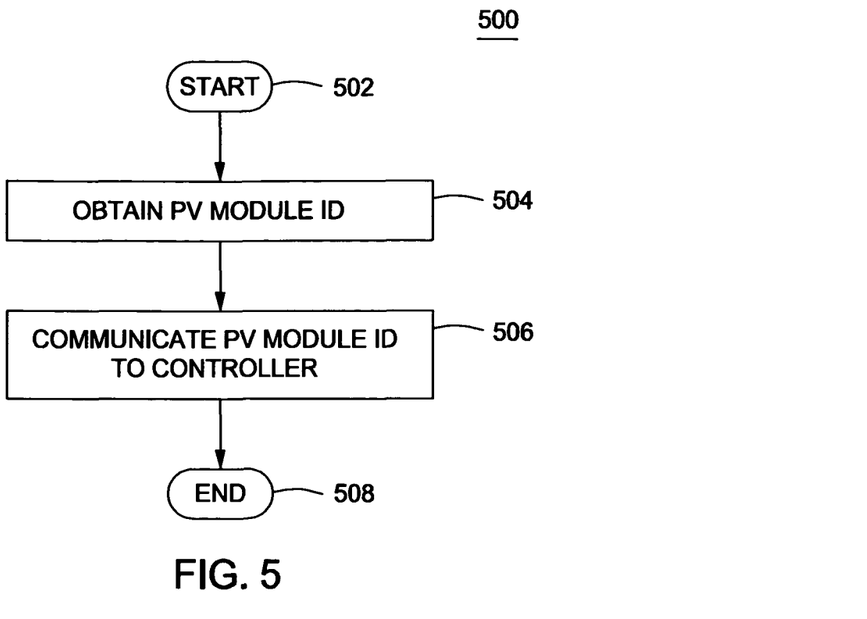
FIG. 5 is a flow diagram of a method for managing ID information at an inverter in accordance with one or more embodiments of the present invention.

FIG. 5 is a flow diagram of a method 500 for managing ID information at an inverter in accordance with one or more embodiments of the present invention. In some embodiments, such as an embodiment described below, an inverter is deployed within a DG and is coupled to a PV module for inverting DC power from the PV module to AC power (e.g., the PV module 104 coupled to the inverter 106 within the DG 102); in alternative embodiments, the inverter may be coupled to a plurality of PV modules. Additionally, the inverter is coupled to a controller (e.g., the controller 108) for managing the inverter, as previously described. In one or more alternative embodiments, the DG may comprise other types of renewable energy sources (e.g., wind farms, hydroelectric systems, or the like), and the inverter is coupled to such energy sources for inverting DC power from the energy sources to AC power.

The method 500 starts at step 502 and proceeds to step 504, where the inverter obtains a unique PV module ID, such as a serial number, identifying the coupled PV module. In some embodiments, an ID tag (e.g., an ID tag 110, which may be an RFID tag, a simple ROM module, or similar device for communicating an ID) is coupled to the PV module for providing the PV module ID. The ID tag may be coupled to the PV module during commissioning of the DG or during manufacturing of the PV module; alternatively, the ID tag may be built into the PV module. The ID tag may be passive (i.e., not requiring a power supply) or active (e.g., powered by a battery or other power source). In one or more alternative embodiments where the DG comprises other types of renewable energy sources, the inverter may obtain unique IDs for one or more components of such renewable energy sources, for example, from ID tags coupled to the components.

The inverter may utilize a wireless transceiver (e.g., a wireless transceiver within the inverter) to wirelessly obtain the PV module ID from the ID tag; alternatively, the PV module ID may be obtained via a wired connection between the inverter and the ID tag. In some embodiments, the inverter may interrogate the ID tag to obtain the PV module ID or, alternatively, the ID tag may actively transmit the PV module ID to the inverter. The inverter may obtain the PV module ID from the ID tag upon initial activation of the inverter, such as during commissioning of the DG or when replacing an existing inverter and/or PV module. In some embodiments, the inverter may obtain the PV module ID from the ID tag on a periodic basis, where the periodicity may be set by a user or predefined; additionally or alternatively, the inverter may obtain the PV module ID following daily activation of the inverter once sufficient solar energy is provided to operate the inverter, for example subsequent to sunrise.

In some embodiments, the inverter may store the obtained PV module ID within its memory; additionally or alternatively, the inverter memory may store a unique ID for the inverter, such as a serial number.

The method 500 proceeds to step 506. At step 506, the inverter communicates the PV module ID to the controller, for example, via PLC. The inverter may additionally communicate the inverter ID and/or an association between the PV module ID and the inverter ID (i.e., an indication that a particular PV module is coupled to a particular inverter) to the controller. In some embodiments, the inverter may actively transmit the PV module ID, inverter ID, and/or the ID association to the controller; alternatively, the controller may retrieve some or all of such ID information from the inverter. In one or more alternative embodiments, the inverter may communicate with the controller through other types of wired communications and/or wireless communication. The method 500 then proceeds to step 508 where it ends.

Figure 6:
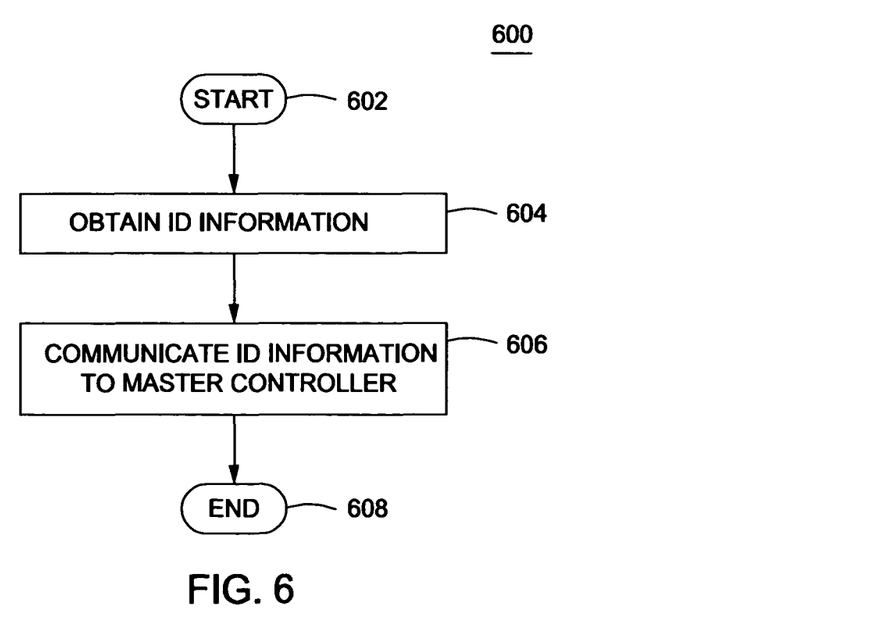
FIG. 6 is a flow diagram of a method for managing ID information at a controller in accordance with one or more embodiments of the present invention.

FIG. 6 is a flow diagram of a method 600 for managing ID information at a controller in accordance with one or more embodiments of the present invention. In some embodiments, such as an embodiment described below, a DG comprises a plurality of PV modules coupled to a plurality of inverters in a one-to-one correspondence for inverting DC power from the PV modules to AC power (e.g., the PV modules 104 coupled to the inverters 106 within the DGs 102); in some alternative embodiments, each inverter may be coupled to multiple PV modules, or the plurality of PV modules may be coupled to a single centralized inverter for inverting the DC power. A controller (e.g., the controller 108) is coupled to the inverters for managing the inverters, and a master controller (e.g., the master controller 114) is communicatively coupled to the controller via a communications network for managing the DG. In some alternative embodiments, the DG may comprise other types of renewable energy sources (e.g., wind farms, hydroelectric systems, or the like), and one or more inverters are coupled to such energy sources for inverting DC power from the energy sources to AC power.

As previously described with respect to the method 500, each inverter obtains a unique PV module ID identifying the PV module to which it is coupled; additionally, each inverter may store a unique inverter ID and/or ID association information within its memory. In one or more alternative embodiments where the DG comprises other types of renewable energy sources, the inverter may obtain unique IDs for one or more components of such renewable energy sources, for example, from ID tags coupled to the components.

The method 600 begins at step 602 and proceeds to step 604, where the controller obtains ID information from the inverters. The controller may obtain the ID information when the inverters are initially activated, for example during commissioning of the DG or when one or more inverters and/or PV modules are replaced within the DG. In some embodiments, the controller may obtain the ID information on a periodic basis, where the periodicity may be set by a user or predefined; additionally or alternatively, the controller may obtain the ID information following daily activation of the inverters once sufficient solar energy is provided to operate the inverters, for example subsequent to sunrise.

The ID information comprises IDs that uniquely identifies components of the DG, such as the PV module IDs and/or inverter IDs. Additionally, the ID information may comprise ID associations indicating relationships between the PV modules and the inverters (i.e., which PV modules are coupled to which inverters). In some embodiments, the controller may receive the PV module IDs and inverter IDs and generate the associations between the corresponding IDs. The controller may also associate the PV module IDs and/or inverter IDs with a unique controller ID stored within its memory, and the controller may store some of all of the ID information within its memory. In some alternative embodiments, the controller may obtain the PV module IDs directly from, for example, ID tags coupled to the PV modules.

The method 600 proceeds to step 606. At step 606, the controller communicates at least a portion of the ID information (e.g., PV module IDs, inverter IDs, the controller's ID, associations between IDs) to the master controller, for example utilizing wired or wireless communication techniques as previously described; in some embodiments, the master controller may retrieve the ID information from the controller. The controller may communicate the ID information to the master controller upon initial activation, for example during commissioning of the DG, when one or more components of the DG are replaced, on demand, periodically (e.g., upon daily activation of the inverters following sunrise), and/or based on a set schedule. The method 600 then proceeds to step 608 where it ends.

Figure 7:
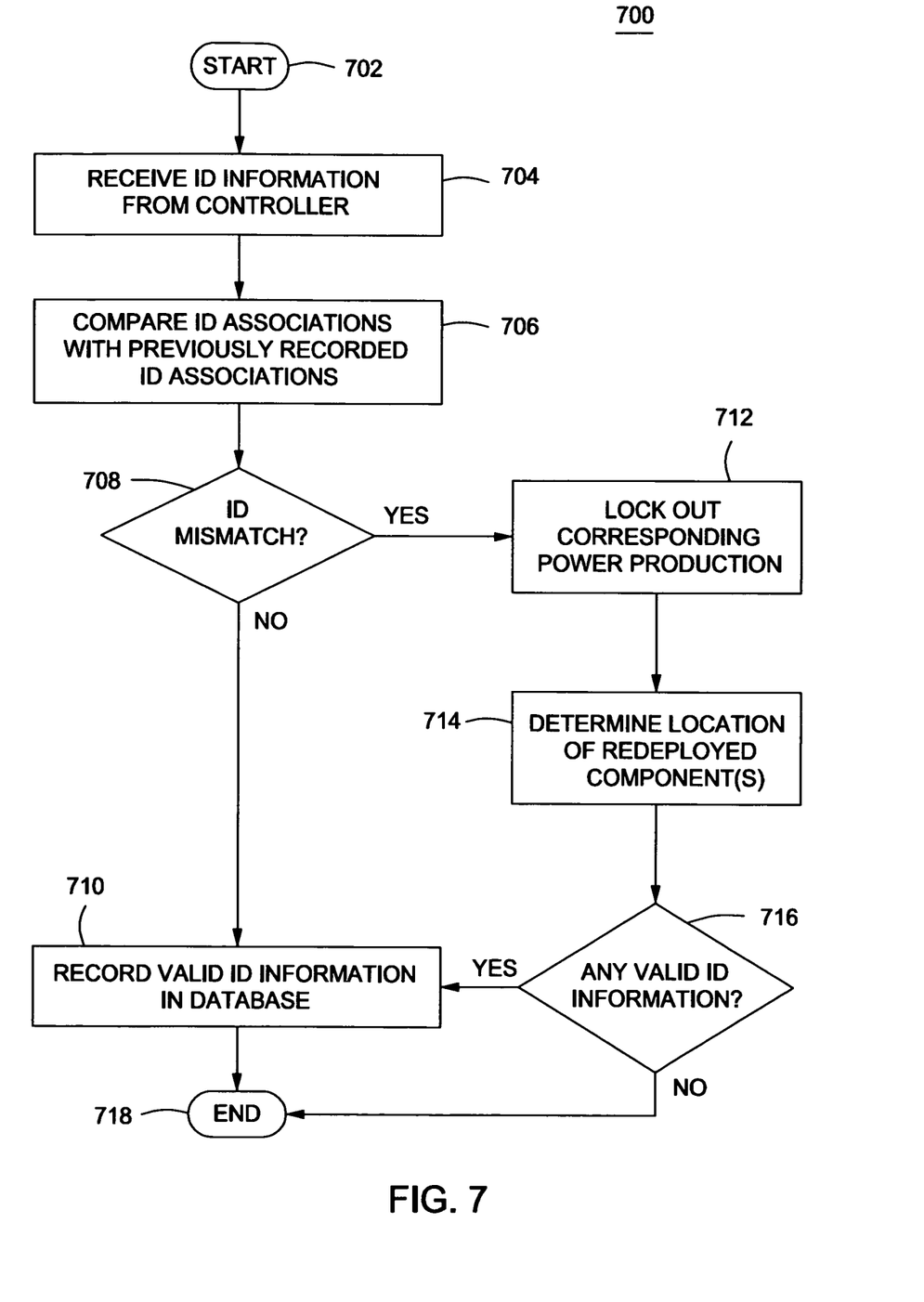
FIG. 7 is a flow diagram of a method for identifying stolen components deployed within a solar power system in accordance with one or more embodiments of the present invention.

FIG. 7 is a flow diagram of a method 700 for identifying components redeployed within a solar power system without authorization in accordance with one or more embodiments of the present invention. In some embodiments, such as the embodiment described below, a master controller is communicatively coupled to a plurality of DGs within a solar power system (e.g., the master controller 114 coupled to the DGs 102 within the solar power system 100). Each DG comprises a plurality of PV modules coupled to a plurality of inverters in a one-to-one correspondence for inverting DC power from the PV modules to AC power; in one or more alternative embodiments, one or more inverters may be coupled to multiple PV modules, and/or one or more DGs may each comprise a single centralized inverter coupled to the plurality of PV modules for inverting the DC power. Within each DG, the inverters are coupled to a controller, for example via PLC, for managing the inverters. The controller is further communicatively coupled to the master controller (via a communications network utilizing wireless and/or wired techniques) for managing the corresponding DG. The controllers obtain ID information pertaining to the corresponding DGs, as previously described with respect to the method 600.

In some alternative embodiments, one or more of the DGs may comprise other types of renewable energy sources (e.g., wind farms, hydroelectric systems, or the like), where one or more inverters are coupled to such energy sources for inverting DC power from the energy sources to AC power. In such embodiments, the inverters may obtain unique IDs for one or more components of such renewable energy sources, for example, from ID tags coupled to the components.

The method 700 begins at step 702 and proceeds to step 704, where the master controller receives ID information from a controller within the solar power system. The controller may provide the ID information to the master controller when the controller is initially activated (e.g., during commissioning of a DG) or when the controller obtains the ID information (e.g., when a PV module is replaced within a DG); alternatively, the controller may periodically provide ID information to the master controller and/or the master controller may periodically query the controller for the ID information. One or both of such periodicities may be defined by a user or may be predetermined. Additionally or alternatively, the master controller may obtain the ID information on demand by a user.

The ID information pertains to one or more components within one or more DGs, and may comprise PV module IDs, inverter IDs, and/or controller IDs, as well as ID associations identifying relationships between the components (e.g., which PV modules are coupled to which inverters, which PV modules and/or inverters are coupled to which controllers, and the like). In some alternative embodiments, the master controller may obtain PV module IDs directly from, for example, ID tags coupled to the PV modules, or the master controller may obtain PV module IDs directly from the corresponding inverters. Additionally or alternatively, the master controller may obtain inverter IDs directly from the inverters.

The method 700 proceeds to step 706. At step 706, the master controller analyzes the received ID associations; i.e., the master controller compares the received ID associations with ID associations for the solar power system that were previously recorded, for example, in a component tracking database. Such a component tracking database may reside within a memory of the master controller. In some embodiments, the master controller may associate PV module IDs and/or inverter IDs for a particular DG with a controller ID of the corresponding controller and then compare the associations with the recorded ID associations.

At step 708, the master controller determines whether any ID mismatches exist; i.e., whether any of the received ID associations have changed from the previously recorded ID associations (e.g., a PV module ID associated with a different inverter ID than that which was previously recorded, a PV module ID/inverter ID pair associated with a different controller ID than that which was previously recorded, and the like). Such ID mismatches (i.e., changes in the ID associations) indicate that the corresponding components had previously been removed without authorization from one DG of the solar power system and redeployed within another DG of the solar power system.

In some embodiments, an ID and/or an association between IDs may include an indicia for indicating when the corresponding components are actually legitimately redeployed within the solar power system (e.g., sold from one DG owner to another) and, therefore, changes in the ID associations should not be considered to indicate that the components have been redeployed without authorization.

If, at step 708, the master controller determines that no ID mismatches exist (i.e., no changes in the ID associations), the method 700 proceeds to step 710, where the received ID information is stored within the component tracking database. If, at step 708, one or more ID mismatches (i.e., changes in the ID associations) are found to exist, the method 700 proceeds to step 712. At step 712, the master controller locks out power production from components corresponding to the mismatched IDs. For example, the master controller may issue commands to specific inverters via the corresponding controller to inhibit power production when the associated PV modules are found to have ID mismatches.

At step 714, the master controller determines the current location of the redeployed components, for example by utilizing the IP address of the corresponding controller to identify the DG in which the redeployed components have appeared. In some embodiments, the master controller may additionally provide notification to the appropriate authorities or a DG user (e.g., the DG owner), for example via the communications network.

At step 716, the master controller determines whether any of the received ID information is valid (i.e., no ID mismatches) and, if not previously recorded, should therefore be added to the component tracking database. For example, when a new DG is commissioned, the master controller may receive ID information for each component within the DG, such as ID associations between each inverter and its corresponding PV module. The master controller may determine that one or more of such ID associations have ID mismatches, while the remaining ID associations do not and are therefore valid. If, at step 716, the master controller determines that a portion of the received ID information is valid, the method 700 proceeds to step 710, where the valid ID information is stored within the component tracking database. The method 700 then proceeds to step 718 where it ends. If, at step 716, the master controller determines that none of the newly received ID information is valid, the method 700 proceeds to step 718 where it ends.

While the foregoing is directed to embodiments of the present invention, other and further embodiments of the invention may be devised without departing from the basic scope thereof, and the scope thereof is determined by the claims that follow.

The invention claimed is:

1. A method for identifying a redeployment of a distributed generator component, at least a portion of the method being performed by a controller comprising at least one processor, the method comprising:
   obtaining a first identification (ID) for a first component of a distributed generator (DG) and a second ID for a second component of the DG;
   generating an association between the first ID and the second ID, wherein the association identifies a relationship between the first and the second components;
   comparing the association to a plurality of documented associations to determine whether the association has changed; and
   adding the association to the plurality of documented associations upon determining that the association has not changed.

2. The method of claim 1, further comprising inhibiting power production by at least one of the first or the second component upon determining that the association has changed.

3. The method of claim 1, further comprising determining a location of at least one of the first or the second component.

4. The method of claim 1 further comprising generating a notification upon determining that the association has changed.

5. The method of claim 1, further comprising electronically transmitting the first ID from an electronic tag coupled to the first component.

6. The method of claim 5, wherein obtaining the first ID comprises electronically interrogating the electronic tag.

7. The method of claim 5, wherein the electronic tag is a radio frequency identification (RFID) tag.

8. The method of claim 1, wherein the first component is a PV module and the second component is an inverter.

9. An apparatus for identifying a redeployment of a distributed generator component, comprising:
   an electronic tag coupled to a first component within a distributed generator (DG) for electronically providing a first identification (ID) identifying the first component; and
   a master controller for comparing an association between the first ID and a second ID, the second ID identifying a second component within the DG, to a plurality of documented associations to determine whether the association has changed, wherein the master controller adds the association to the plurality of documented associations upon determining that the association has not changed.

10. The apparatus of claim 9, further comprising a controller and the second component, wherein the second component communicates the first ID and the second ID to the controller.

11. The apparatus of claim 10, wherein the controller generates the association and communicates the association to the master controller.

12. The apparatus of claim 9, wherein upon determining that the association has changed, the master controller inhibits power production by at least one of the first or the second component.

13. The apparatus of claim 9, wherein the master controller determines a location of at least one of the first or the second component.

14. The apparatus of claim 9, wherein upon determining that the association has changed, the master controller generates a notification.

15. The apparatus of claim 9, further comprising the second component, wherein the second component electronically reads the first ID from the electronic tag.

16. The apparatus of claim 9, wherein the electronic tag is an RFID tag.

17. The apparatus of claim 9, wherein the first component is a PV module and the second component is an inverter.

18. The apparatus of claim 17, further comprising the inverter, wherein the inverter comprises a memory for storing the second ID and a transceiver for transmitting the first ID and the second ID to a controller.

* * * * *